United States Patent Office 3,751,458
Patented Aug. 7, 1973

3,751,458
CITROYLFORMIC ACID AND ITS PRODUCTION
Richard H. Wiley, New York, N.Y., assignor to Miles Laboratories, Inc., Elkhart, Ind.
No Drawing. Filed Mar. 2, 1972, Ser. No. 231,379
Int. Cl. C07c 59/12
U.S. Cl. 260—535 P
2 Claims

ABSTRACT OF THE DISCLOSURE

Citroylformic acid, useful as a sequestrant and as a raw material for the production of citric acid, can be produced by the bimolecular decarboxylative self-condensation of oxaloacetic acid.

BACKGROUND OF THE INVENTION

Oxaloacetic acid is a known compound which is unstable and can be readily decomposed by heat, by alkali, and by metal ions in aqueous media. The only products of such reactions that have been identified with certainty are carbon dioxide and pyruvic acid. There is no known record of any successful conversion of oxaloacetic acid to other useful compounds by aldol types of reactions.

SUMMARY OF THE INVENTION

In accordance with the present invention, a novel composition of matter, citroylformic acid, is provided having the formula:

$$HOOC-\underset{\|}{\overset{O}{C}}-CH_2-\underset{\underset{COOH}{|}}{\overset{OH}{C}}-CH_2-COOH$$

This compound is prepared by the bimolecular decarboxylative self-condensation of oxaloacetic acid.

DESCRIPTION OF THE INVENTION

The oxaloacetic acid used as a raw material for the production of the novel compound, citroylformic acid, is well known and is available commercially. It can also be prepared by palladium chloride-catalyzed air oxidation of maleic acid as described in U.S. Pat. No. 3,356,721.

In the production of citroylformic acid, the oxaloacetic acid is reacted with itself in an aqueous medium at a temperature from about 20° C. to about 30° and at a pH from about 3 to about 11. The initial desired pH is achieved by adding an appropriate amount of alkaline material, such as sodium hydroxide, to the oxaloacetic acid solution. Preferably, the initial pH is from about 7 to about 8.5.

The invention is described in further detail in the following examples.

Example 1

A solution of 3 g. of oxaloacetic acid in 10 ml. of water was adjusted to a pH of 7.5 with 20 weight percent aqueous sodium hydroxide. The resulting mixture was then allowed to stand at 20–30° C. for 48 hours at which time the pH was 8.5. Samples of the mixture were removed after 2, 5, 8, 16, 24 and 48 hours and analyzed by thin layer chromatography using silica gel on polyester sheets as the plate and butanol-formic acid-water as the developing solvent. The plate was dried after spotting at room temperature, developed for 15 min., dried at 80° C. for 15 min. and sprayed with 0.4 percent alcoholic bromocresol green solution. The spots appear as yellow areas on a blue background. A consistent spot was produced having an $R_f$ value of about 77. Only a trace amount was obtained after only 2 hours of reaction time.

The oxaloacetic acid reaction mixture prepared above was mixed with 3 ml. of 60 weight percent aqueous calcium chloride solution to precipitate the calcium salt which was collected and air dried. Two grams of this salt were suspended in 60 ml. of dry ether with 0.9 g. of anhydrous magnesium sulfate. To this mixture was added slowly, with stirring and cooling, a solution of 0.6 ml. of concentrated sulfuric acid in 20 ml. of dry ether. The mixture was filtered and the filtrate on evaporation of the ether gave 0.6 g. of a crystalline residue. Recrystallization from ethyl acetate-carbon tetrachloride gave 0.26 g. (19 percent yield) of pure citroylformic acid having a melting point of 154–156° C. with gas evolution. This product on thin layer chromatography produces a spot having an $R_f$ value of 75–77. Elemental analysis found C:38.23% and H:3.4%. Theoretical values for citroylformic acid are C:38.19% and H:3.66%. Potentiometric titration shows breaks in the curve for neutral equivalent values of 71.4, 113.7 and 217 corresponding to theoretical values of 73.3, 110 and 220 for citroylformic acid. With 2,4-dinitrophenylhydrazine, a derivative is obtained characterized as the pyrazolone diethyl ester.

The product was thus identified as citroylformic acid having a formula of $$HOOC-\underset{\|}{\overset{O}{C}}-CH_2-\underset{\underset{COOH}{|}}{\overset{OH}{C}}-CH_2-COOH$$

The free citroylformic acid sequesters calcium ions effectively as is shown by potentiometric titration of the acid in the presence of calcium ions over the pH range of 2.5–11.5. At a pH of 11.3, for example, the addition of one equivalent of calcium ions depresses the pH to 6.5 with no evidence of precipitation of calcium hydroxide.

Citroylformic acid is also useful for the production of citric acid as is described in the following example.

Example 2

The treatment of 30 mg. of citroylformic acid in 5 ml. of water with 10 drops of 30 percent hydrogen peroxide gives a reaction product which upon thin layer chromatography analysis shows a spot having a strong $R_f$ value of 64 which compares with a value of about 60 for a citric acid control. This indicates the formation of citric acid from citroylformic acid.

What is claimed is:
1. Citroylformic acid.
2. A process for the synthesis of citroylformic acid which comprises the bimolecular decarboxylative self-condensation of oxaloacetic acid at about 20 to 30° C. and at a pH of about 3 to 11.

References Cited
UNITED STATES PATENTS
3,356,721  12/1967  Wiley _____ 260—535 P LORRAINE A. WEINBERGER, Primary Examiner
P. J. KILLOS, Assistant Examiner